United States Patent
Lu (10) Patent No.: US 9,311,261 B2
(45) Date of Patent: Apr. 12, 2016

(54) UNIVERSAL SERIAL INTERFACE AND SEMICONDUCTOR DEVICE INCLUDING THE SAME (71) Applicant: SAMSUNG ELECTRONICS CO., LTD., Suwon-si (KR)

(72) Inventor: Yiming Lu, Hangzhou (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/313,242

(22) Filed: Jun. 24, 2014

(65) Prior Publication Data

US 2015/0006767 A1 Jan. 1, 2015

(30) Foreign Application Priority Data

Jun. 27, 2013 (CN) .......................... 2013 1 0262867
Jan. 21, 2014 (KR) ........................ 10-2014-0007475

(51) Int. Cl.
G06F 13/12 (2006.01)
G06F 13/00 (2006.01)
G06F 3/00 (2006.01)
G06F 13/38 (2006.01)
G06F 13/28 (2006.01)

(52) U.S. Cl.
CPC .............. *G06F 13/382* (2013.01); *G06F 13/28* (2013.01)

(58) Field of Classification Search
None
See application file for complete search history.

(56) References Cited

U.S. PATENT DOCUMENTS

| 8,959,272 B2* | 2/2015 | Lamm et al. ................. 710/313 |
| 2005/0086434 A1* | 4/2005 | Kang et al. ................... 711/115 |
| 2008/0244120 A1* | 10/2008 | Park ................................ 710/65 |
| 2015/0032917 A1* | 1/2015 | Nguyen .......................... 710/51 |

* cited by examiner

*Primary Examiner* — David E Martinez
(74) *Attorney, Agent, or Firm* — Sughrue Mion, PLLC (57) ABSTRACT A universal serial interface (USI) includes two transceivers configured to separately support a plurality of serial communication standards; a buffer configured to store received data and data to be transmitted; and a transceiver controller configured to connect one of the two transceivers to the buffer based on a configuration signal received from outside of the USI.

19 Claims, 8 Drawing Sheets

UNIVERSAL SERIAL INTERFACE AND SEMICONDUCTOR DEVICE INCLUDING THE SAME

CROSS-REFERENCE TO RELATED APPLICATIONS

This application claims the benefit of Korean Patent Application No. 10-2014-0007475, filed on Jan. 21, 2014, in the Korean Intellectual Property Office, and Chinese Patent Application No. 201310262867.X, filed on Jun. 27, 2013, in the State Intellectual Property Office (SIPO) of the People's Republic of China, the disclosures of which are incorporated herein in their entirety by reference.

BACKGROUND

1. Field

The exemplary embodiments relate to a universal serial interface (USI) and a semiconductor device including the same, and more particularly, to a USI for supporting a plurality of serial communication standards and a semiconductor device including the USI.

2. Description of the Related Art

With the development of semiconductor integration technologies, a system on chip (SOC) has been manufactured, the SOC including blocks configured as separate chips to respectively perform functions. The SOC may be used in various electronic devices, and especially, in mobile electronic devices of which sizes and power consumption are important. The SOC may include a processor, and peripheral blocks connected to the processor. The SOC may include a bus connecting the processor and the peripheral blocks, and may also include a memory such as a static random access memory (SRAM).

One of the peripheral blocks included in the SOC may serially communicate with other peripheral blocks included in the SOC or with a chip (or a semiconductor device) located outside the SOC. The blocks serially communicating with one another may be referred to as serial communication interfaces. The serial communication interfaces, together with the other peripheral blocks and the chip located outside the SOC, may comply with pre-arranged serial communication standards and may serially communicate with one another.

SUMMARY

The exemplary embodiments relate to a universal serial interface (USI) and a semiconductor device including the same, and provide a USI which supports serial communication standards and a semiconductor device including the same.

According to an aspect of an exemplary embodiment, there is provided a semiconductor device including at least one universal serial interface (USI). The at least one USI includes: a transceiver configured to separately support a plurality of serial communication standards; a buffer configured to store received data and data to be transmitted; and a transceiver controller configured to connect one of the two transceivers to the buffer based on a configuration signal received from outside of the USI.

The USI may further include a special function register which is configured to store a value that is derived from the configuration signal. The transceiver controller may be configured to connect one of the two transceivers to the buffer according to the value stored in the special function register.

The USI may further include a direct memory access (DMA) logic configured to control a DMA operation of the USI, and the transceiver controller may be configured to connect one of the two transceivers to the DMA logic based on the configuration signal.

The USI may further include a clock logic configured to generate a clock signal, and the transceiver controller may be configured to provide the clock signal to one of the two transceivers based on the configuration signal.

The USI may further include an interrupt logic configured to output an interrupt signal to the outside of the USI, and the transceiver controller may be configured to connect one of the two transceivers to the interrupt logic based on the configuration signal.

The USI may further include an input/output multiplexer configured to connect one of the two transceivers to an external channel of the USI based on the configuration signal.

Each of the two transceivers may include a transmitter and a receiver, the buffer may include a transmitting first input first output (FIFO) memory and a receiving FIFO memory, and, based on the configuration signal, the transceiver controller may be configured to connect the transmitter and the receiver included in one of the two transceivers to the transmitting FIFO memory and the receiving FIFO, respectively.

The two transceivers may be configured to support two of an inter-integrated circuit (IIC), a universal asynchronous receiver/transmitter (UART) and a serial peripheral interface (SPI).

The USI may further include a special function register configured to store a predetermined value, and the semiconductor device may further include a central processing unit (CPU) configured to write the predetermined value in the special function register such that the USI operates by supporting one of the serial communication standards.

The semiconductor device may be a system on chip (SOC) which includes a dedicated serial interface which includes another transceiver configured to support one of the serial communication standards.

According to another aspect of an exemplary embodiment, there is provided a universal serial interface including two of an inter-integrated circuit (IIC) transceiver, a universal asynchronous receiver/transmitter (UART) transceiver and a serial peripheral interface (SPI) transceiver. The two of the IIC transceiver, the UART transceiver and the SPI transceiver may be configured to share a first-in first-out (FIFO) memory.

The two of the IIC transceiver, the UART transceiver and the SPI transceiver may be further configured to share a direct memory access (DMA) logic.

The two of the IIC transceiver, the UART transceiver and the SPI transceiver may be further configured to share a part of a special function register, and the shared part of the special function register may be configured to store a value determining a function of the FIFO memory and a value determining an on/off function of the two of the IIC transceiver, the UART transceiver and the SPI transceiver.

The two of the IIC transceiver, the UART transceiver and the SPI transceiver may be configured to share a part of clock logic, and the shared part of the clock logic may include a part corresponding to a function of the FIFO memory in the clock logic.

The two of the IIC transceivers, the UART transceiver and the SPI transceiver may be configured to share a part of interrupt logic, and the shared part of the interrupt logic may include a part corresponding to a function of the FIFO memory stored in the interrupt logic.

BRIEF DESCRIPTION OF THE DRAWINGS

Exemplary embodiments will be more clearly understood from the following detailed description taken in conjunction with the accompanying drawings in which.

DETAILED DESCRIPTION OF THE EXEMPLARY EMBODIMENTS

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
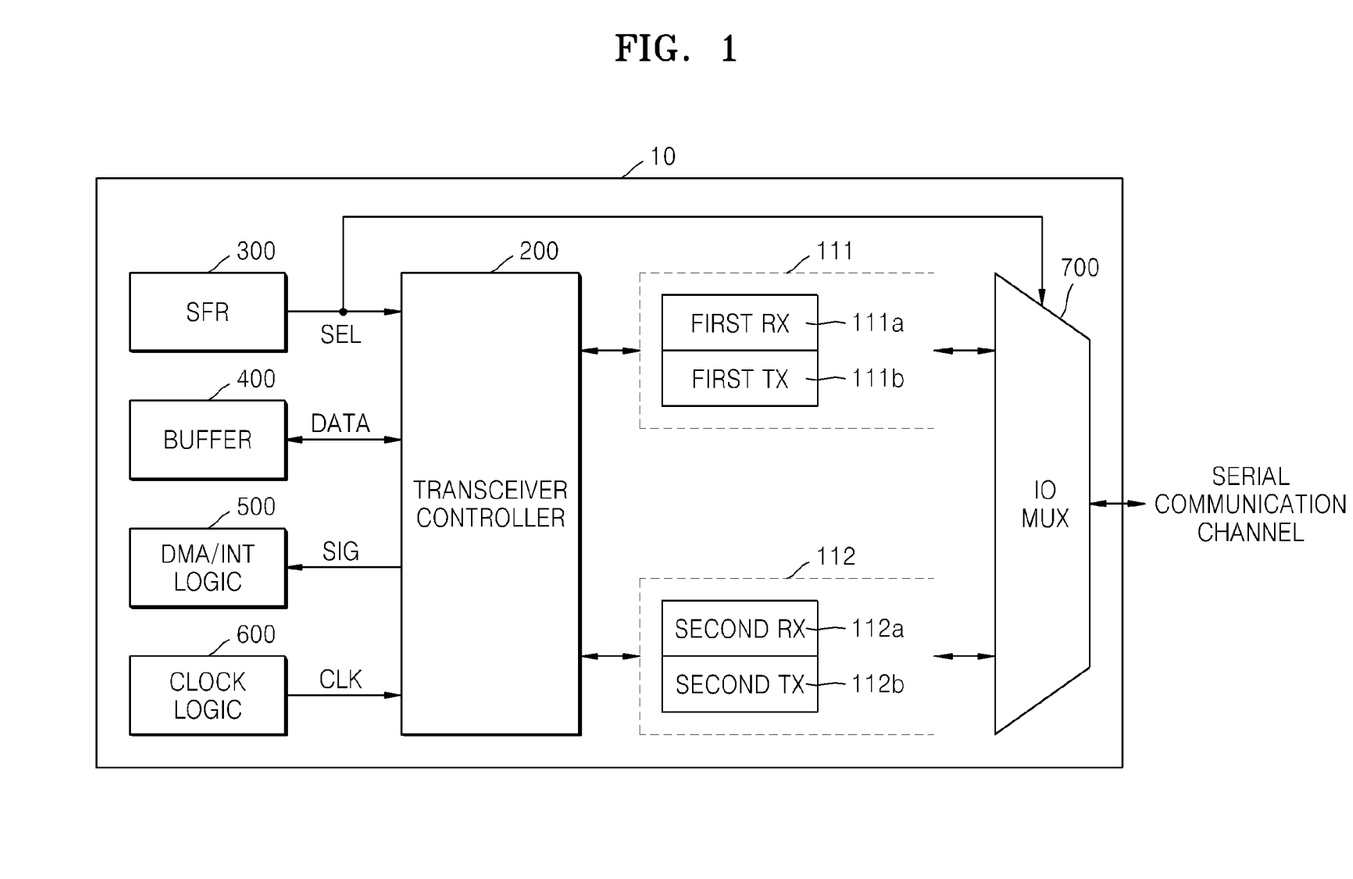
FIG. 1 is a block diagram of a universal serial interface (USI) according to an exemplary embodiment.

FIG. 1 is a block diagram of a universal serial interface (USI) 10 according to an exemplary embodiment. The USI 10 may support at least two serial communication standards, and may support, for example, an inter-integrated circuit (IIC), a universal asynchronous receiver/transmitter (UART), or a serial peripheral interface (SPI). The IIC is a bus or a serial communication standard which uses bidirectional lines such as a serial data line (SDA) and a serial clock line (SCL), and may be referred to as I2C. The UART is hardware or a serial communication standard which is used together with communication standards such as RS-232, RS-422, and RS-485. The SPI is a bus or a serial communication standard which communicates using a master-slave mode, and may use four lines (a serial clock, a master output, a master input, and a slave select).

As illustrated in FIG. 1, the USI 10 may serially communicate with other devices through a serial communication channel. The USI 10 may be implemented as hardware logic within a semiconductor device that may serially communicate with other logic circuits included in the semiconductor device, or may be configured as a chip separate from the semiconductor device. As illustrated in FIG. 1, the USI 10 may include a first transceiver 111, a second transceiver 112, a transceiver controller 200, a special function register (SFR) 300, a buffer 400, direct memory access (DMA)/interrupt logic 500, clock logic 600, and an input/output multiplexer 700. The USI 10 may be referred to as a universal serial communication interface, a universal serial communication interface module, a universal communication interface module, or the like.

The USI 10 may include transceivers for respectively supporting at least two serial communication standards. For example, as illustrated in FIG. 1, the USI 10 may include the first transceiver 111 and the second transceiver 112, and the first transceiver 111 and the second transceiver 112 may support first and second serial communication standards, respectively. For example, the first and second serial communication standards may correspond to two of the IIC, UART, and SPI, respectively. Although FIG. 1 illustrates that the USI 10 includes two transceivers 111 and 112, the exemplary embodiments are not limited thereto, and three or more transceivers may be included.

The first transceiver 111 may include a first receiver 111a and a first transmitter 111b, and the second transceiver 112 may include a second receiver 112a and a second transmitter 112b. The first receiver 111a may support a first serial communication standard and may receive data from the serial communication channel via the input/output multiplexer 700. The first transmitter 111b may support the first serial communication standard and may transmit the data to the serial communication channel via the input/output multiplexer 700. Likewise, the second receiver 112a and the second transmitter 112b may support the second serial communication standard and may receive and transmit the data from and to the serial communication channel via the input/output multiplexer 700.

The special function register 300 may store data (or a value) for configuring the USI 10. For example, the special function register 300 may store the data according to a configuration signal received from outside of the USI 10 (e.g., from another device located outside of the USI 10), and the data stored in the special function register 300 may correspond to information used to select serial communication standards supported by the USI 10, information used to indicate a baud rate of the selected serial communication standards, and various other types of information. Also, the special function register 300 may store data which indicates information used to control the buffer 400. For example, the special function register 300 may store data which indicates a width of data (for example, the number of bits) stored in the buffer 400, and data which indicates a capacity of the buffer 400 (for example, a depth of a first input first output (FIFO) memory).

The buffer 400 may store data to be transmitted to the serial communication channel and data received from the serial communication channel via the USI 10. For example, the buffer 400 may include the FIFO memory (hereinafter, also referred to as FIFO) and the FIFO may be classified into a receiving FIFO and a transmitting FIFO. The DMA/interrupt logic 500 may control an operation of the DMA of the USI 10 and may generate an interrupt signal outside the USI 10. For example, the DMA/interrupt logic 500 may control an operation of writing the data stored in the buffer 400 on a memory device located outside the USI 10 and may control an operation of writing the data stored in the memory device on the buffer 400. The clock logic 600 may generate at least one clock signal CLK and may provide the at least one clock signal CLK to components included in the USI 10. For example, the clock logic 600 may provide the clock signal CLK to the first transceiver 111 or the second transceiver 112 via the transceiver controller 200 and may also provide the clock signal CLK to the buffer 400.

According to the present exemplary embodiment, the USI 10 may include the transceiver controller 200. The transceiver controller 200 may control the first and second transceivers 111 and 112 based on the configuration signal received from outside of the USI 10. For example, the transceiver controller 200 may receive a selection signal SEL from the special function register 300 and, according to the received selection signal, may select any one of the first and second transceivers 111 and 112. The special function register 300 may output the selection signal SEL according to the configuration signal received from the outside of the USI 10. That is, the transceiver controller 200 may select one of the first and second transceivers 111 and 112 based on the configuration signal received from the outside of the USI 10 in order for the USI 10 to support one of the first and second serial communication standards. The transceiver controller 200 may turn on or off the first and second transceivers 111 and 112 according to the received selection signal SEL. Hereinafter, for convenience of explanation, it is assumed that the first transceiver 111 is selected according to the selection signal SEL.

The transceiver controller 200 may connect the selected first transceiver 111 to the buffer 400. For example, the transceiver controller 200 may connect the first transceiver 111 to the buffer 400 in order for the first transceiver 111 to store the data received from the serial communication channel in the buffer 400. Also, the transceiver controller 200 may connect the first transceiver 111 to the buffer 400 in order for the first transceiver 111 to transmit the data stored in the buffer 400 to the serial communication channel.

When the selected first transceiver 111 completes reception or transmission of the data, the transceiver controller 200 may transmit a completion signal SIG to the DMA/interrupt logic 500. For example, when the first transceiver 111 completes an operation of storing the data received from the serial communication channel in the buffer 400, the transceiver controller 200 may transmit the completion signal SIG to the DMA/interrupt logic 500. Accordingly, the DMA/interrupt logic 500 may transmit a signal or an interrupt signal for a DMA operation to the outside of the USI 10.

The transceiver controller 200 receives the clock signal CLK from the clock logic 600 and may provide the received clock signal CLK to the selected first transceiver 111. That is, the transceiver controller 200 may prevent the clock signal CLK from being provided to the second transceiver 112 that is not selected. Also, the transceiver controller 200 may prevent electric power from being provided to the second transceiver 112 that is not selected. By preventing the clock signal CLK or the electric power from being provided to the second transceiver 112 that is not selected, the second transceiver 112 may be prevented from unnecessarily consuming electric power.

The input/output multiplexer 700 may select one of the first and second transceivers 111 and 112 according to the selection signal SEL, and may connect the selected transceiver to the serial communication channel. For example, according to the selection signal SEL, the input/output multiplexer 700 may transmit, to the serial communication channel, a signal output from the first and second transceivers 111 and 112, and may transmit the signal received from the serial communication channel to one of the first and second transceivers 111 and 112. For example, the number of lines necessary for communication may vary according to the serial communication standards, and the input/output multiplexer 700 may connect the first or second transceiver 111 or 112 to the serial communication channel via the number of signal lines that is appropriate for the serial communication standards supported by the first and second transceivers 111 and 112.

Figure 2:
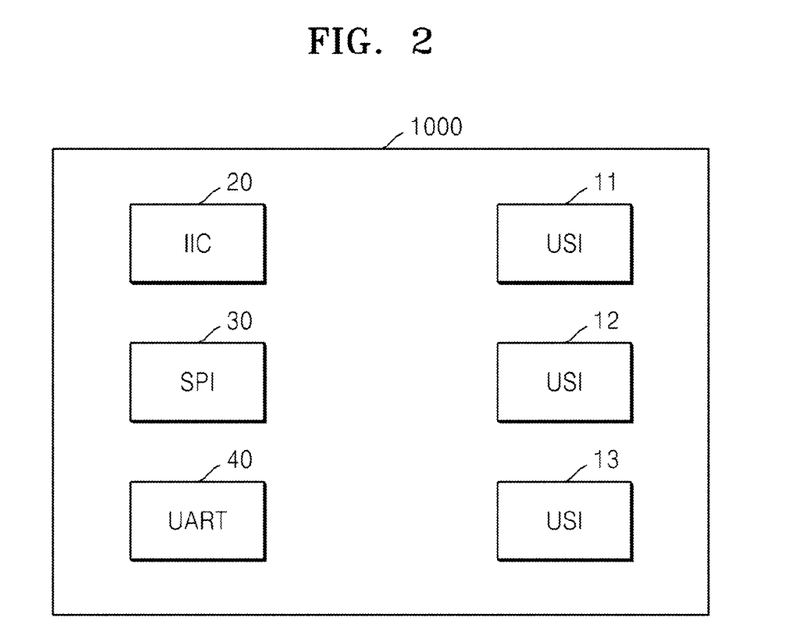
FIG. 2 is a block diagram of a system on chip (SOC) including a USI according to an exemplary embodiment.

FIG. 2 shows a system on chip (SOC) 1000 including USIs 11, 12 and 13 according to an exemplary embodiment. The SOC 1000 may include a plurality of serial communication interfaces. For example, as illustrated in FIG. 2, the SOC 1000 may include an IIC interface 20, an SPI 30, a UART interface 40, and three USIs 11, 12 and 13. The serial communication interfaces may be used to communicate with many different types of devices, including, for example, a Bluetooth module, a wireless fidelity (Wi-Fi) module, a debugging device, a battery power monitoring module, a sensor, etc. A serial communication interface for supporting one serial communication standard such as the IIC interface 20, the SPI 30, the UART interface 40, and the USIs 11, 12 and 13 may also be referred to as an exclusive serial interface.

Since applications and/or solutions which are used with the serial communication interfaces may be different (for example, in the case of a smart phone, the SOC 1000 may be used for voice communication and navigation), the number of each of the IIC interface 20, the SPI 30, and the UART interface 40 used may be different depending on the solution. In general, according to the solutions in which the SOC 1000 is used, the operations may primarily use the IIC interface modules, and thus, the UART interface modules and the SPI interface modules may not actually be necessary. Thus, a chip area and the interfaces may be wasted and, as a result, the chip area becomes unnecessarily wide, and manufacturing costs increase.

According to an exemplary embodiment, each of the USIs 11, 12 and 13 may function as any one of the IIC interface 20, the SPI 30 and the UART interface 40, according to requirements of the SOC 1000. Accordingly, the SOC 1000 may reduce the number of the serial communication interfaces while maintaining the flexibility of a structure of the SOC 1000 by using the USIs 11, 12 and 13.

Figure 3A:
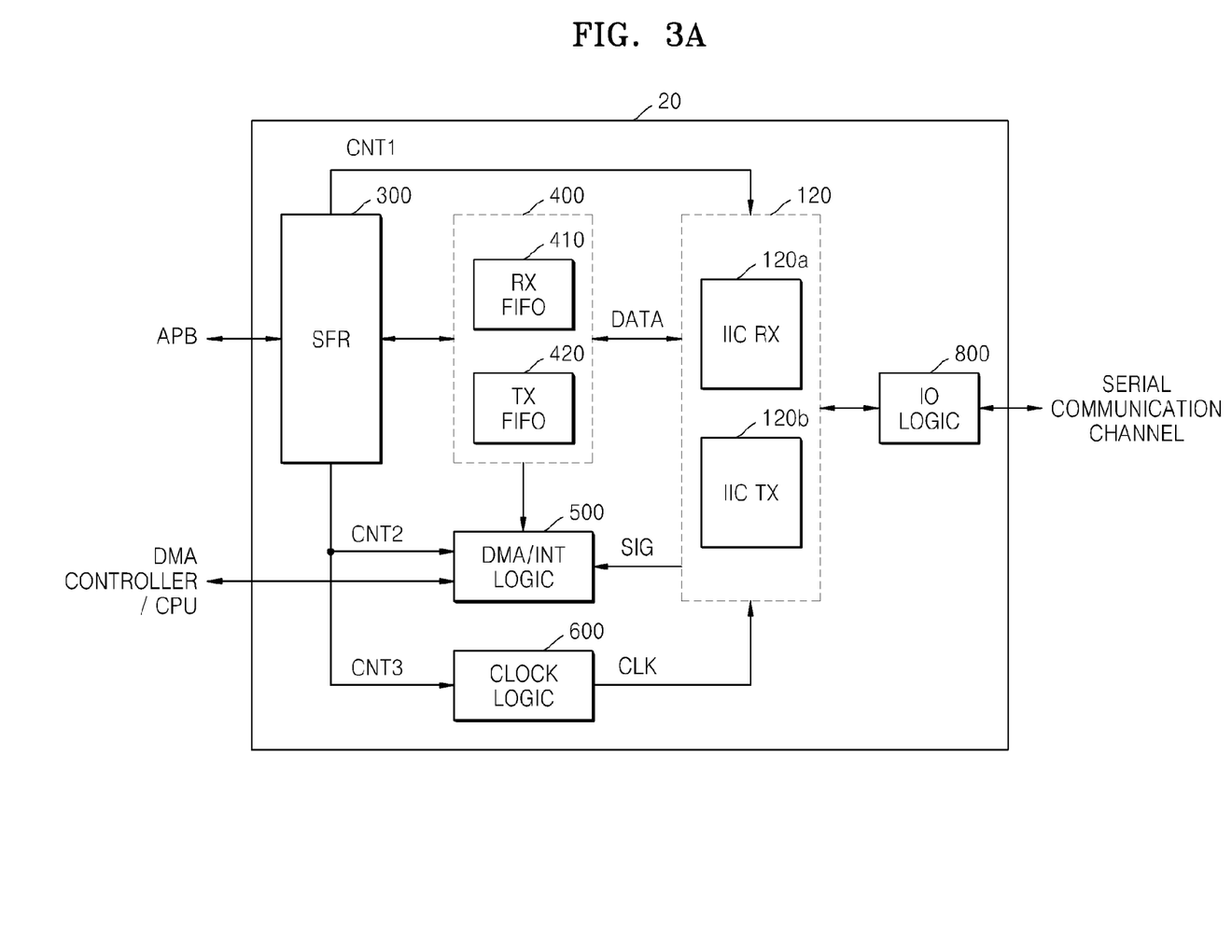
FIGS. 3A, 3B and 3C are block diagrams of an inter-integrated circuit (IIC) interface, a universal asynchronous receiver/transmitter (UART) interface, and a serial peripheral interface (SPI) of FIG. 2 according to exemplary embodiments.
Figure 3B:
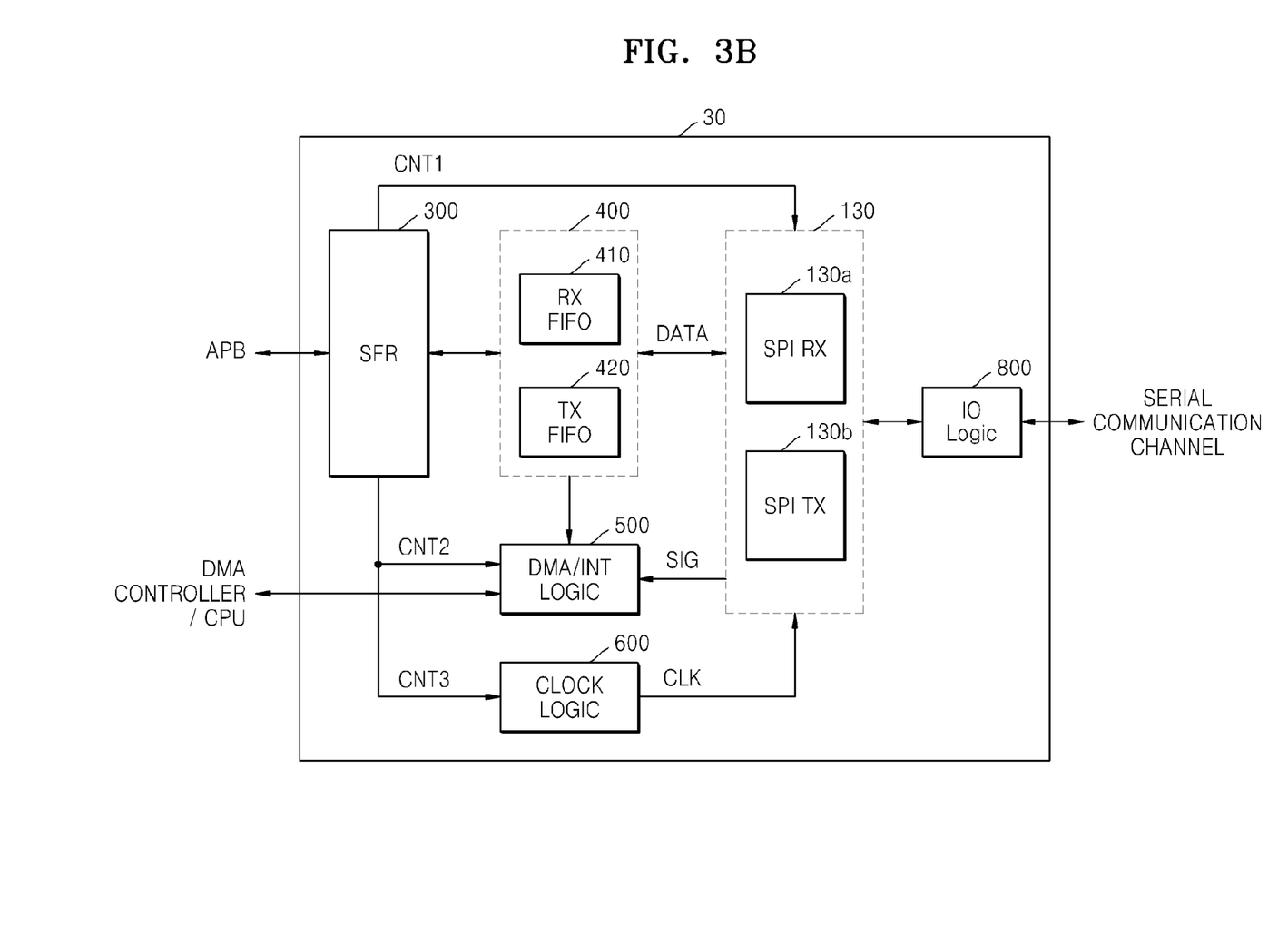
Figure 3C:
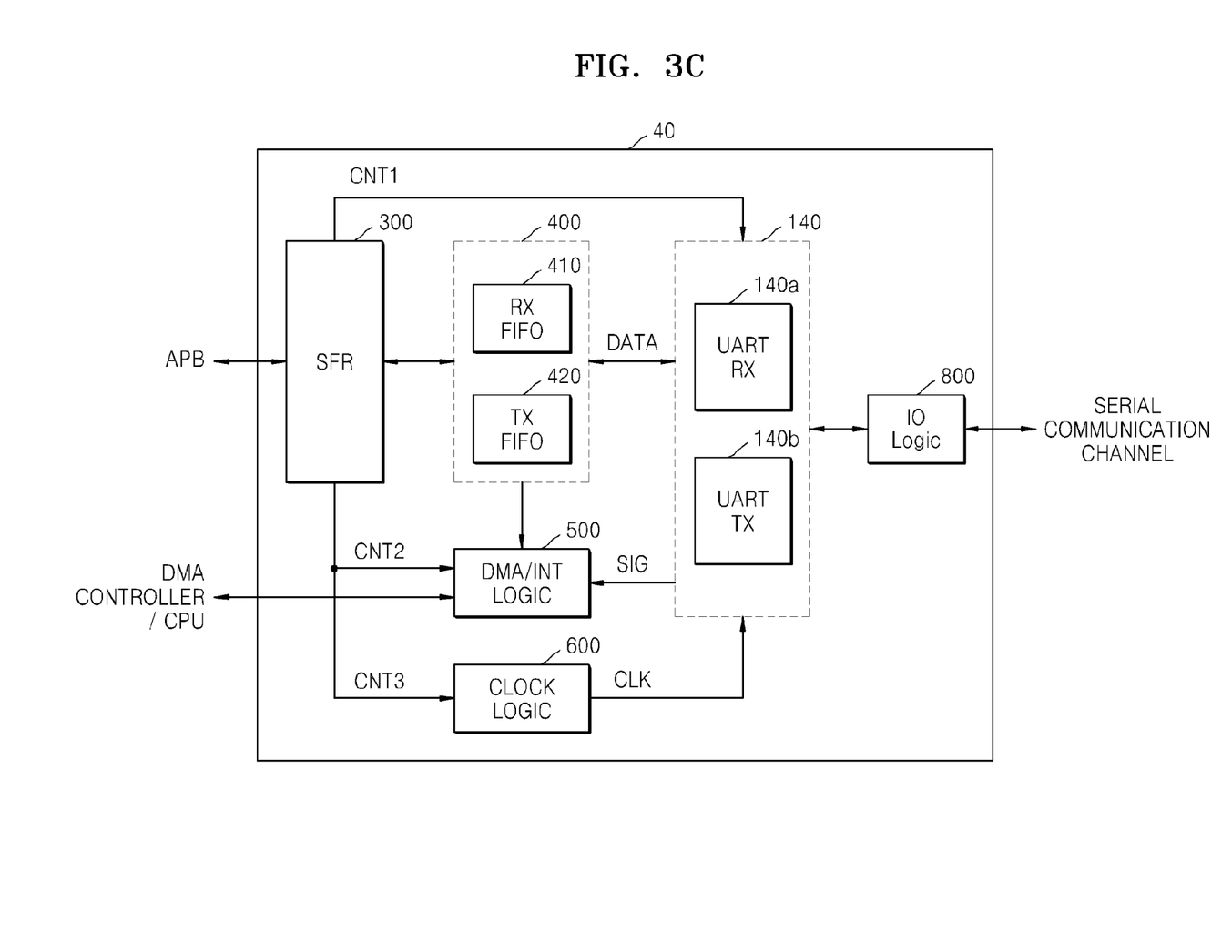

FIGS. 3A through 3C are block diagrams of the IIC interface 20, the SPI 30, and the UART interface 40, respectively, of FIG. 2, according to exemplary embodiments. As illustrated in FIGS. 3A through 3C, the IIC interface 20, the SPI 30, and the UART interface 40 may respectively include an IIC transceiver 120, an SPI transceiver 130 and a UART transceiver 140 which respectively support the IIC, the SPI, and the UART. The IIC transceiver 120 may include an IIC receiver (IIC RX) 120a and an IIC transmitter (IIC TX) 120b, and the SPI transceiver 130 may include an SPI receiver (SPI RX) 130a and an SPI transmitter (SPI TX) 130b. Also, the UART transceiver 140 may include a UART receiver (UART RX) 140a and a UART transmitter (UART TX) 140b. Each of the IIC interface 20, the SPI 30, and the UART interface 40 includes one transceiver, that is, the IIC interface 20, the SPI 30, and the UART interface 40 respectively include the IIC transceiver 120, the SPI transceiver 130, and the UART transceiver 140, and thus, may support one serial communication standard.

As illustrated in FIGS. 3A through 3C, each of the IIC interface 20, the SPI 30, and the UART interface 40 may include the special function register 300, the buffer 400, the DMA/interrupt logic 500, the clock logic 600, and the input/output logic 800. The special function register 300, the buffer 400, the DMA/interrupt logic 500, and the clock logic 600 may perform operations similar to those illustrated with reference to FIG. 1. However, each of the special function register 300, the buffer 400, the DMA/interrupt logic 500, and the clock logic 600 may have a special function according to each serial communication standard. The input/output logic 800 is logic connecting the IIC transceiver 120, the SPI transceiver 130, and the UART transceiver 140 to the serial communication channel, and may include a bidirectional buffer, a tri-state buffer, and various other types of buffers.

The special function register 300 may be connected to a bus outside the serial communication interfaces, that is, the IIC interface 20, the SPI 30, and the UART interface 40. For example, as illustrated in FIGS. 3A through 3C, the special function register 300 may be connected to an advanced peripheral bus (APB) outside the IIC interface 20, the SPI 30, and the UART interface 40. In addition, the special function register 300 may output control signals CNT1 through CNT3 for controlling each component included in the IIC interface 20, the SPI 30 or the UART interface 40. Also, as illustrated in FIG. 1 and FIGS. 3A through 3C, the DMA/interrupt logic 500 may receive the completion signal SIG from the IIC transceiver 120, the SPI transceiver 130 and the UART transceiver 140. Accordingly, a signal for the DMA may be transmitted to a DMA controller, or an interrupt signal may be transmitted to a central processing unit (CPU).

Figure 4:
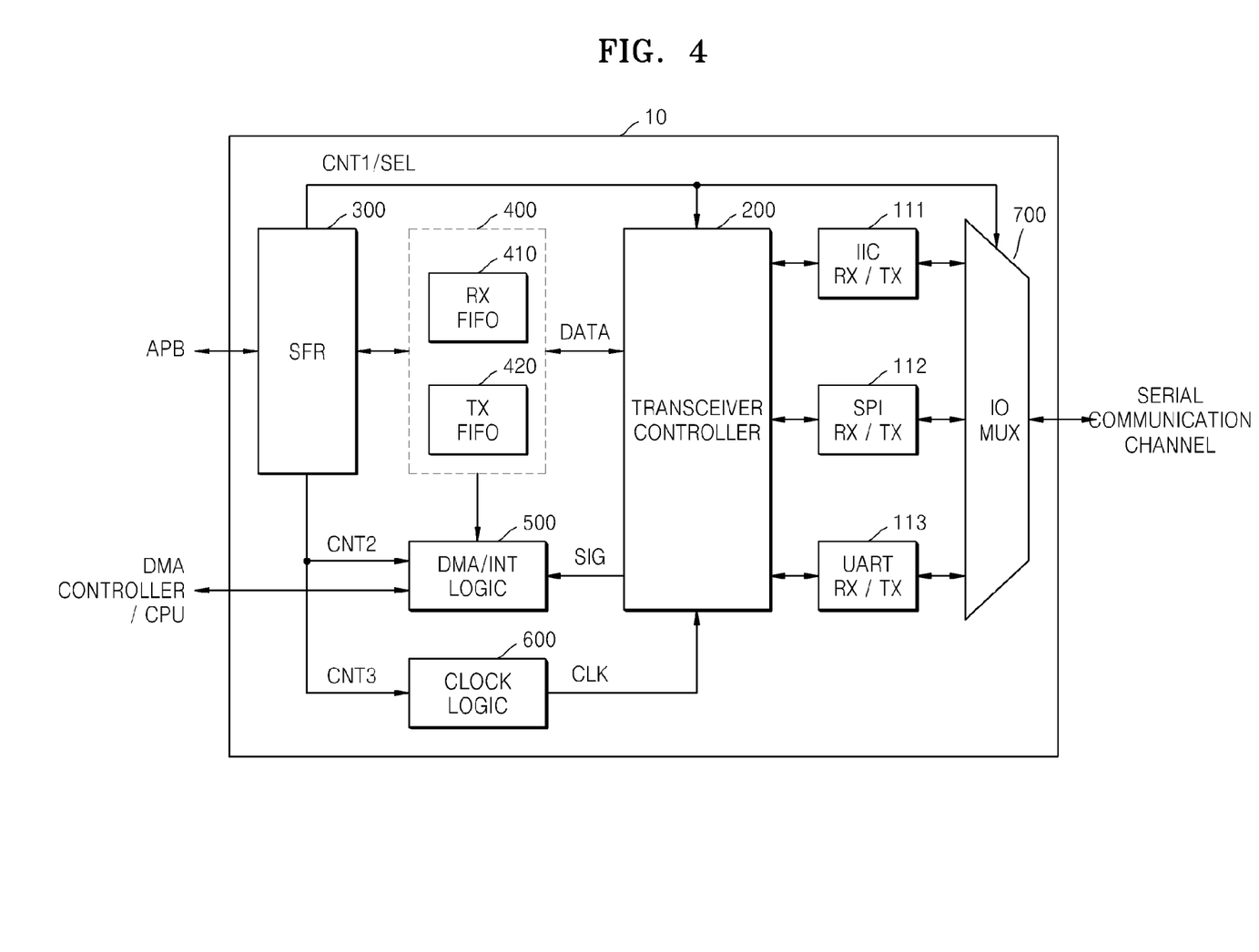
FIG. 4 is a block diagram of a USI according to an exemplary embodiment.

FIG. 4 is a block diagram of the USI 10 according to an exemplary embodiment. Referring to FIGS. 1 and 4, the USI 10 may include the first transceiver 111, the second transceiver 112, and a third transceiver 113, and may also include the transceiver controller 200, the special function register 300, the buffer 400, the DMA/interrupt logic 500, the clock logic 600, and the input/output multiplexer 700.

The USI 10 may include the first transceiver 111, the second transceiver 112, and the third transceiver 113. For example, as illustrated in FIG. 4, each of the first transceiver 111, the second transceiver 112, and the third transceiver 113 may be configured as an IIC transceiver, an SPI transceiver, and a UART transceiver. Each of the first transceiver 111, the second transceiver 112, and the third transceiver 113 may include a receiver and a transmitter. That is, the first transceiver 111 configured as an IIC transceiver may include the IIC receiver and the IIC transmitter, and the second transceiver 112 configured as an SPI transceiver may include the SPI receiver and the SPI transmitter. The third transceiver 113 configured as a UART transceiver may include the UART receiver and the UART transmitter. As illustrated in FIG. 4, the buffer 400 may include a receiving FIFO for storing the data received via the serial communication channel, and a transmitting FIFO for storing the data to be transmitted to the serial communication channel.

The transceiver controller 200 may select one of the first transceiver 111, the second transceiver 112, and the third transceiver 113 according to the selection signal SEL received from the special function register 300. For example, the transceiver controller 200 may select the first transceiver 111 configured as an IIC transceiver according to the selection signal SEL. Accordingly, the transceiver controller 200 may transmit data, which the transceiver controller 200 receives from the serial communication channel via the first transceiver 111, to the buffer 400. Alternatively, the transceiver controller 200 may transmit the data stored in the buffer 400 to the first transceiver 111. Also, as the first transceiver 111 completes reception or transmission of the data, the transceiver controller 200 may transmit the completion signal SIG to the DMA/interrupt logic 500. The transceiver controller 200 may provide the selected first transceiver 111 with the clock signal CLK received from the clock logic 600. Meanwhile, the input/output multiplexer 700 may connect one of the first transceiver 111, the second transceiver 112, and the third transceiver 113 to the serial communication channel according to the selection signal SEL. The first transceiver 111, the second transceiver 112, and the third transceiver 113 may share the special function register 300, the buffer 400, the DMA/interrupt logic 500, and the clock logic 600 through the transceiver controller 200. Accordingly, the USI 10 includes the transceiver controller 200 and at least one transceiver. In addition, by sharing other components, the USI 10 may selectively support the serial communication standards. FIG. 4 illustrates the IIC transceiver, the SPI transceiver, and the UART transceiver, but the present exemplary embodiment is not limited thereto. Also, transceivers for supporting other serial communication standards may be included according to other exemplary embodiments.

Figure 5:
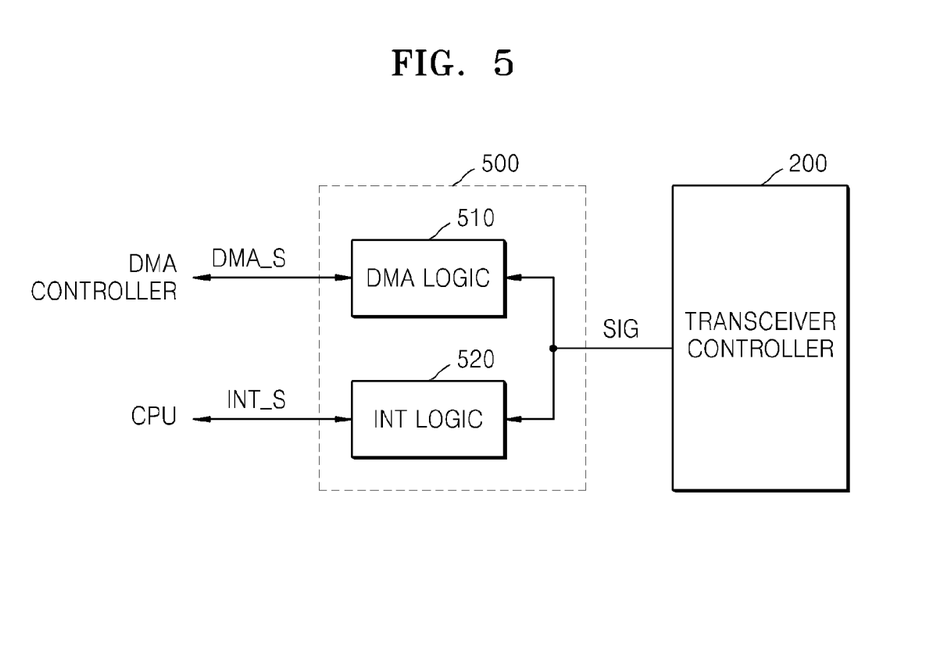
FIG. 5 illustrates a direct memory access (DMA)/interrupt logic according to an exemplary embodiment.

FIG. 5 illustrates the DMA/interrupt logic 500 according to an exemplary embodiment. Referring to FIGS. 1 through 4, the DMA/interrupt logic 500 may receive the completion signal SIG from the transceiver controller 200, may control a DMA operation of the USI 10, and may generate an interrupt signal INT_S to be transmitted outside the USI 10.

As illustrated in FIG. 5, the DMA/interrupt logic 500 may include DMA logic 510 and interrupt logic 520. The DMA logic 510 may receive the completion signal SIG from the transceiver controller 200 and may receive and transmit signals DMA_S from and to the DMA controller outside the USI 10, to enable the DMA operation. The interrupt logic 520 may receive the completion signal SIG from the transceiver controller 200 and may transmit the interrupt signal INT_S to the CPU outside the USI 10.

Figure 6:
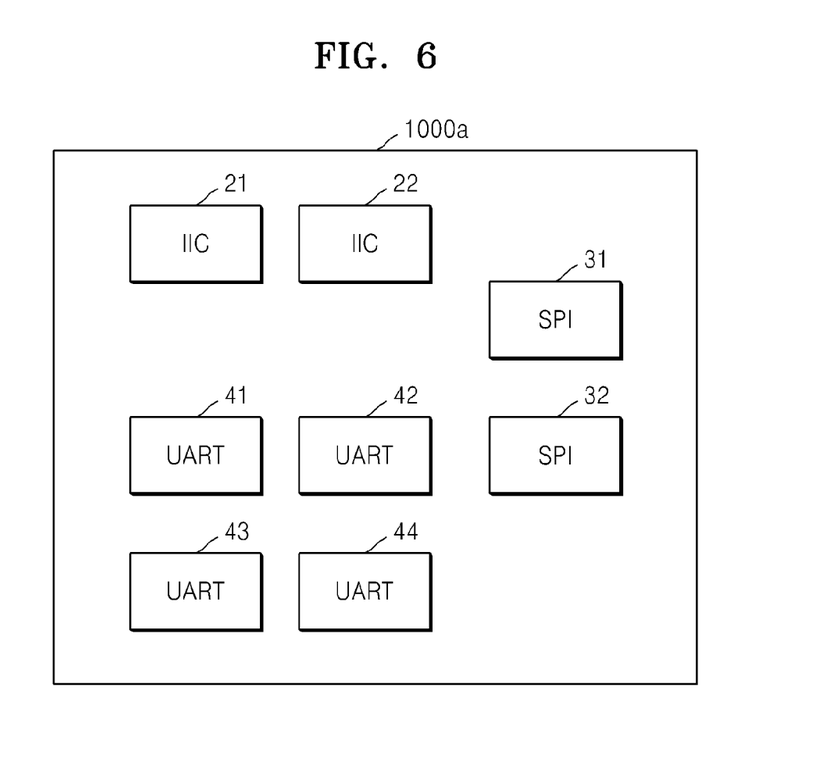
FIG. 6 illustrates a SOC including a plurality of serial interfaces, which may be compared to the SOC of FIG. 2 according to an exemplary embodiment.

FIG. 6 illustrates a SOC 1000a including USIs that may be compared to the SOC 1000 according to an exemplary embodiment. The SOC 1000a may include serial communication interfaces for supporting serial communication standards, respectively. For example, as illustrated in FIG. 6, the SOC 1000a may include two IIC interfaces 21 and 22, two SPI interfaces 31 and 32, and four UART interfaces 41 to 44. Each of the serial communication interfaces may be used to communicate with a Bluetooth module, a Wi-Fi module, a debugging device, a battery power monitoring module, a sensor, and other types of devices located inside or outside the SOC 1000a.

Applications using the SOC 1000a may require a different number of, or different types of, serial communication channels. Therefore, a variety of the serial communication interfaces may be included in the SOC 1000a in order to support operation of each of the applications. According to the applications, some of the serial communication interfaces may not be used, and furthermore, the number of the serial communication interfaces may not be enough to support a certain type of serial communication standard. For example, when two UART channels are required in an application in which the SOC 1000a is used, two of the UART interfaces 41 to 44 may remain unused. Also, when three SPI channels are required in an application in which the SOC 1000a is used, the application may require not only the SOC 1000a but also a semiconductor device (or chip) including a separate SPI interface.

Referring to FIGS. 2 and 6, the SOC 1000 of FIG. 2 includes the IIC interface 20, the SPI 30, and the UART interface 40 for respectively supporting the serial communication standards as well as the USIs 11 to 13, and thus, the application may be flexible when using the SOC 1000. That is, according to necessity, the application may use each of the USIs 11 to 13 to support the specific serial communication standards. Therefore, an area occupied by the serial communication interfaces in the SOC 1000 may be reduced, and costs of manufacturing the SOC 1000 may be decreased.

Figure 7:
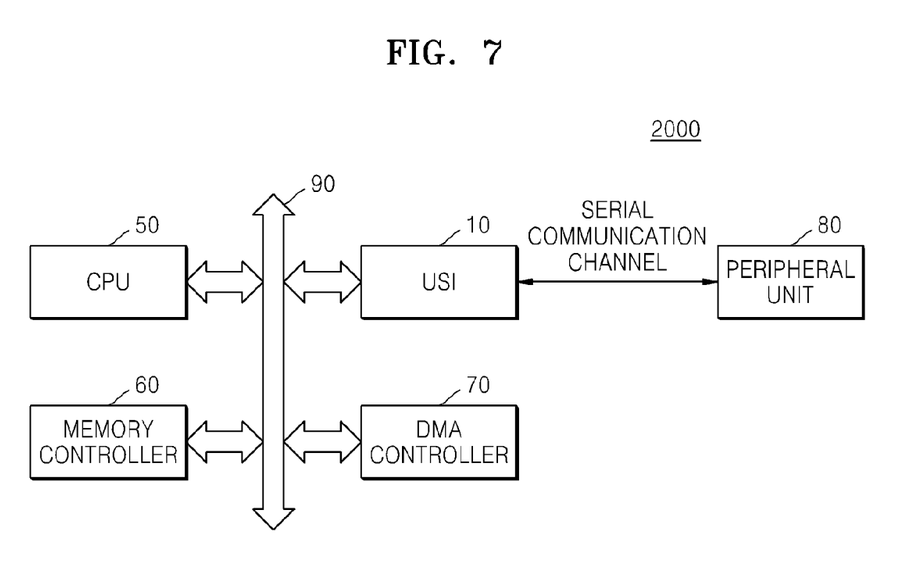
FIG. 7 is a block diagram of a system including a USI according to an exemplary embodiment.

FIG. 7 is a block diagram of a system 2000 including the USI 10 according to an exemplary embodiment. As illustrated in FIG. 7, the system 2000 may include the USI 10, the CPU 50, a memory controller 60, the DMA controller 70, a peripheral unit 80, and a bus 90. The USI 10, the CPU 50, the memory controller 60, and the DMA controller 70 may be electrically connected to one another via the bus 90.

The CPU 50 may execute a program and may control the system 2000. Referring to FIGS. 1 and 7, the CPU 50 may store data in the special function register 300 included in the USI 10. For example, the CPU 50 may store preset data in the special function register 300 in order for the USI 10 to operate according to the serial communication standard supported by one of the first and second transceiver 111 and 112. The transceiver controller 200 of the USI 10 may receive the selection signal SEL according to the data stored by the special function register 300 and may select one of the first and second transceiver 111 and 112 based on the selection signal SEL.

The memory controller 60 may control a memory (for example, a dynamic random access memory (DRAM)) connected to the system 2000 and may store data received via the bus 90 in the memory or transmit data stored in the memory via bus 90 to other components. For example, with reference to FIG. 5, the DMA controller 70 may receive and transmit the signal DMA_S from and to the USI 10 and may control an operation in which the USI 10 directly writes the data received via the serial communication channel on the memory via the memory controller 60.

The USI 10 may be connected to the peripheral unit 80 via the serial communication channel. For example, the USI 10 may support one serial communication standard such as the IIC interface 20, the SPI 30, and the UART interface 40 according to the data stored in the special function register 300 by the CPU 50. The peripheral unit 80 may include, for example, the Bluetooth module, the Wi-Fi module, the debugging device, the battery power monitoring module, the sensor, and various other types of devices, and may communicate with the USI 10 via the serial communication channel.

The system 2000 may be a SOC in which the components illustrated in FIG. 7 are included in one semiconductor chip or may be a module in which the components illustrated in FIG. 7 are included in two or more semiconductor devices (or chips) and configured on a board. The system 2000 shown in FIG. 7 includes one USI 10, but exemplary embodiments are not limited thereto. For example, according to other exemplary embodiments, the system 2000 may include two or more USIs 10 and exclusive serial interfaces for supporting the serial communication standards, respectively.

Figure 8:
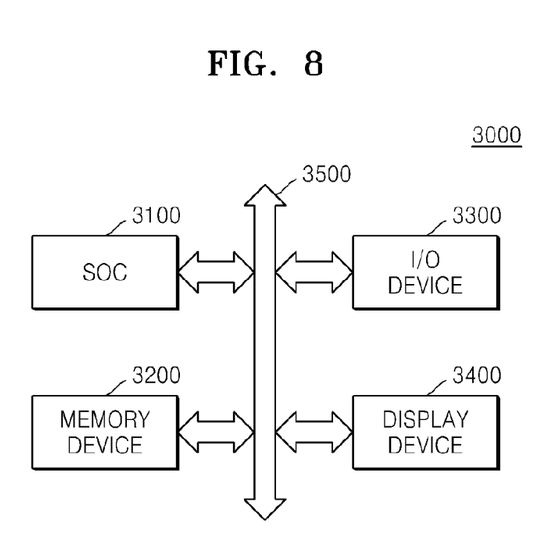
FIG. 8 is a block diagram of a computing system including a SOC according to an exemplary embodiment.

FIG. 8 is a block diagram of a computing system 3000 including a SOC 3100 according to an exemplary embodiment. The SOC 3100 may be mounted in the computing system 3000, where the computing system may be implemented as many different types of electronic devices, such as a mobile device, a desktop computer or a server.

The computing system 3000 may include the SOC 3100, a memory device 3200, an input/output device 3300, and a display device 3400, and each component may be electrically connected to a bus 3500. In the computing system 3000 of FIG. 8, the above-described USI 10 may be included in the SOC 3100.

Referring to FIGS. 7 and 8, the SOC 3100 may include the CPU 50 and may fully control the SOC 3000. Also, the SOC 3100 may perform an operation corresponding to a command of a user input via the input/output device 3300. The memory device 3200 may be implemented as, for example, a DRAM, and may function as a data memory of the SOC 3100. In addition, the memory device 3200 may be implemented as a non-volatile memory, for example, a flash memory. The display device 3400 may output a signal corresponding to video or audio to the outside of the computing system 3000 based on data received from the bus 3500.

According to an exemplary embodiment, the components of the computing system 3000, for example, the input/output device 3300 or the display device 3400, may communicate with the SOC 3100 via a serial communication channel. That is, the SOC 3100 may serially communicate with the input/output device 3300 or the display device 3400 via the USI 10 included in the SOC 3100. For example, the input/output device 3300 may include an image sensor, and the SOC 3100 may serially communicate with the image sensor via the USI 10 in order to control an operation of the image sensor.

While certain exemplary embodiments have been particularly shown and described, it will be understood that various changes in form and details may be made therein without departing from the spirit and scope of the exemplary embodiments.

What is claimed is:

1. A semiconductor device comprising:
a universal serial interface (USI),
wherein the USI comprises:
two transceivers configured to separately support a plurality of serial communication standards;
a buffer configured to store received data and data to be transmitted; and
a transceiver controller configured to select one of the two transceivers based on a configuration signal received from outside of the USI and connect only the selected transceiver to the buffer.

2. The semiconductor device of claim 1, wherein the USI further comprises a special function register configured to store a value that is derived from the configuration signal, and
wherein the transceiver controller is configured to connect one of the two transceivers to the buffer according to the value stored in the special function register.

3. The semiconductor device of claim 1, wherein the USI further comprises a direct memory access (DMA) logic configured to control a DMA operation of the USI, and
wherein the transceiver controller is configured to connect one of the two transceivers to the DMA logic based on the configuration signal.

4. The semiconductor device of claim 1, wherein the USI further comprises a clock logic configured to generate a clock signal, and
wherein the transceiver controller is configured to provide the clock signal to one of the two transceivers based on the configuration signal.

5. The semiconductor device of claim 1, wherein the USI further comprises an interrupt logic configured to output an interrupt signal to the outside of the USI, and
wherein the transceiver controller is configured to connect one of the two transceivers to the interrupt logic based on the configuration signal.

6. The semiconductor device of claim 1, wherein the USI further comprises an input/output multiplexer configured to connect one of the two transceivers to an external channel of the USI based on the configuration signal.

7. The semiconductor device of claim 1, wherein each of the two transceivers comprises a transmitter and a receiver,
wherein the buffer comprises a transmitting first input first output (FIFO) memory and a receiving FIFO memory, and
wherein, based on the configuration signal, the transceiver controller is configured to connect the transmitter and the receiver comprised in one of the two transceivers to the transmitting FIFO memory and the receiving FIFO memory, respectively.

8. The semiconductor device of claim 1, wherein the two transceivers are configured to support two of an inter-integrated circuit (IIC), a universal asynchronous receiver/transmitter (UART) and a serial peripheral interface (SPI).

9. The semiconductor device of claim 1,
wherein the USI further comprises a special function register configured to store a predetermined value, and
wherein the semiconductor device further comprises a central processing unit (CPU) configured to write the predetermined value in the special function register such that the USI operates by supporting one of the plurality of serial communication standards.

10. The semiconductor device of claim 9, wherein the semiconductor device comprises a system on chip (SOC) which comprises a dedicated serial interface which comprises another transceiver configured to support one of the plurality of serial communication standards.

11. A universal serial interface comprising:
two of an inter-integrated circuit (IIC) transceiver, a universal asynchronous receiver/transmitter (UART) transceiver and a serial peripheral interface (SPI) transceiver,
wherein the two of the IIC transceiver, the UART transceiver and the SPI transceiver are configured to share a first-in first-out (FIFO) memory,
wherein the two of the IIC transceiver, the UART transceiver and the SPI transceiver are further configured to share a part of a special function register, and
wherein the shared part of the special function register is configured to store a value determining a function of the FIFO memory and a value determining an on/off function of the two of the IIC transceiver, the UART transceiver and the SPI transceiver.

12. The universal serial interface of claim 11, wherein the two of the IIC transceiver, the UART transceiver and the SPI transceiver are further configured to share a direct memory access (DMA) logic.

13. A universal serial interface comprising:
two of an inter-integrated circuit (IIC) transceiver, a universal asynchronous receiver/transmitter (UART) transceiver and a serial peripheral interface (SPI) transceiver,
wherein the two of the IIC transceiver, the UART transceiver and the SPI transceiver are configured to share a first-in first-out (FIFO) memory,
wherein the two of the IIC transceiver, the UART transceiver and the SPI transceiver are configured to share a part of clock logic, and
wherein the shared part of the clock logic comprises a part corresponding to a function of the FIFO memory in the clock logic.

14. A universal serial interface comprising:
two of an inter-integrated circuit (IIC) transceiver, a universal asynchronous receiver/transmitter (UART) transceiver and a serial peripheral interface (SPI) transceiver,
wherein the two of the IIC transceiver, the UART transceiver and the SPI transceiver are configured to share a first-in first-out (FIFO) memory,
wherein the two of the IIC transceiver, the UART transceiver and the SPI transceiver are configured to share a part of interrupt logic, and
wherein the shared part of the interrupt logic comprises a part corresponding to a function of the FIFO memory stored in the interrupt logic.

15. A system on chip, comprising:
a plurality of universal serial interfaces (USIs), each of the plurality of USIs being configured to support a plurality of serial communication standards; and
a central processing unit (CPU) configured to generate a configuration signal to set each of the USIs to communicate with a peripheral device using one of the supported plurality of serial communication standards, according to a serial communication standard by which the peripheral device is configured to communicate,
wherein each of the USIs comprises:
two transceivers configured to separately support the plurality of serial communication standards;
a buffer configured to store received data and data to be transmitted; and
a transceiver controller configured to select one of the two transceivers based on the configuration signal and connect only the selected transceiver to the buffer.

16. The system on chip of claim 15, wherein the plurality of serial communication standards comprise an inter-integrated circuit (IIC), a universal asynchronous receiver/transmitter (UART) and a serial peripheral interface (SPI).

17. The system on chip of claim 16, wherein each of the USIs comprises:
a special function register comprising data usable to configure the respective USI to communicate according to the serial communication standard by which the peripheral device is configured to communicate; and
a buffer configured to store data to be transmitted to, or received from, the peripheral device.

18. The system on chip of claim 17, wherein the data usable to configure the respective USI comprises data indicating a baud rate of the serial communication standard by which the peripheral device is configured to communicate.

19. The system on chip of claim 18, implemented in a mobile device.

\* \* \* \* \*